United States Patent
Zwicky et al.

(10) Patent No.: US 9,925,988 B1
(45) Date of Patent: Mar. 27, 2018

(54) STEERING AND BRAKING CONTROL SYSTEM

(71) Applicant: Ford Global Technologies, LLC, Dearborn, MI (US)

(72) Inventors: Timothy D. Zwicky, Dearborn, MI (US); Shane Elwart, Ypsilanti, MI (US); Michael Hafner, Ann Arbor, MI (US); Xingping Chen, Troy, MI (US); Paul James Novak, Dexter, MI (US); Jiyi Liu, Ann Arbor, MI (US); Andy Chuan Hsia, Ann Arbor, MI (US); Levasseur Tellis, Southfield, MI (US); Greg Blaisdell Stevens, Ann Arbor, MI (US)

(73) Assignee: FLORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/441,278

(22) Filed: Feb. 24, 2017

(51) Int. Cl.
| | |
|---|---|
| *B60W 50/02* | (2012.01) |
| *B60W 50/14* | (2012.01) |
| *B60W 10/20* | (2006.01) |
| *B60W 10/04* | (2006.01) |
| *B60W 10/184* | (2012.01) |
| *B60W 30/02* | (2012.01) |
| *B62D 5/04* | (2006.01) |
| *G01S 19/42* | (2010.01) |
| *G05D 1/00* | (2006.01) |

(52) U.S. Cl.
CPC ........ *B60W 50/0225* (2013.01); *B60W 10/04* (2013.01); *B60W 10/184* (2013.01); *B60W 10/20* (2013.01); *B60W 30/02* (2013.01); *B60W 50/14* (2013.01); *B62D 5/0409* (2013.01); *B60W 2050/143* (2013.01); *G01S 19/42* (2013.01); *G05D 1/0088* (2013.01)

(58) Field of Classification Search
CPC ...... B60W 50/02; B60W 50/14; B60W 10/20; B60W 10/04; B60W 10/184; B60W 30/02; B60W 2050/143; B62D 5/0409; G01S 19/42; G05D 1/0088
See application file for complete search history.

(56) References Cited

U.S. PATENT DOCUMENTS

| | | | |
|---|---|---|---|
| 3,893,528 A | 7/1975 | Rehfeld | |
| 6,010,198 A * | 1/2000 | Nakazawa | B60T 8/404 303/10 |
| 6,470,250 B2 * | 10/2002 | Nishizaki | B60T 8/1755 303/146 |
| 7,331,642 B2 | 2/2008 | Miller | |
| 7,681,960 B2 * | 3/2010 | Wanke | B60L 8/17555 303/146 |
| 9,145,166 B2 * | 9/2015 | Mizutani | B60W 10/184 |

(Continued)

*Primary Examiner* — Russell Frejd
(74) *Attorney, Agent, or Firm* — Frank A. MacKenzie; Bejin Bieneman PLC

(57) ABSTRACT

A control system for a vehicle includes a computer. The computer is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system and a second maximum yaw torque resulting from actuating a brake system.

17 Claims, 4 Drawing Sheets

(56) References Cited

U.S. PATENT DOCUMENTS

| | | | |
|---|---|---|---|
| 2004/0046447 A1* | 3/2004 | Wanke | B60T 8/17555 303/140 |
| 2006/0100766 A1* | 5/2006 | Schwarz | B60T 8/1755 701/71 |
| 2006/0273657 A1* | 12/2006 | Wanke | B60L 8/17555 303/146 |
| 2009/0088917 A1 | 4/2009 | Ross-Martin | |
| 2009/0210112 A1* | 8/2009 | Waldbauer | B60T 8/1708 701/42 |
| 2015/0151737 A1* | 6/2015 | Birch | B60W 10/06 701/22 |
| 2016/0236679 A1 | 8/2016 | Inoue et al. | |
| 2016/0325721 A1 | 11/2016 | Jonasson et al. | |

* cited by examiner

STEERING AND BRAKING CONTROL SYSTEM

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

An electronic vehicle stability control system in a vehicle is designed to reduce loss of traction by road wheels of the vehicle. A controller responsible for the electronic vehicle stability control receives steering-wheel angle, lateral acceleration, vehicle yaw, and speeds of each road wheel. The controller determines and compares the vehicle's intended direction and actual direction. If the intended and actual direction are different, the vehicle is skidding. The controller then actuates brakes on the road wheels individually to counteract the skidding, such as on an outer front wheel to counteract oversteer or on an inner rear wheel to counteract understeer.

DETAILED DESCRIPTION

Figure 1:
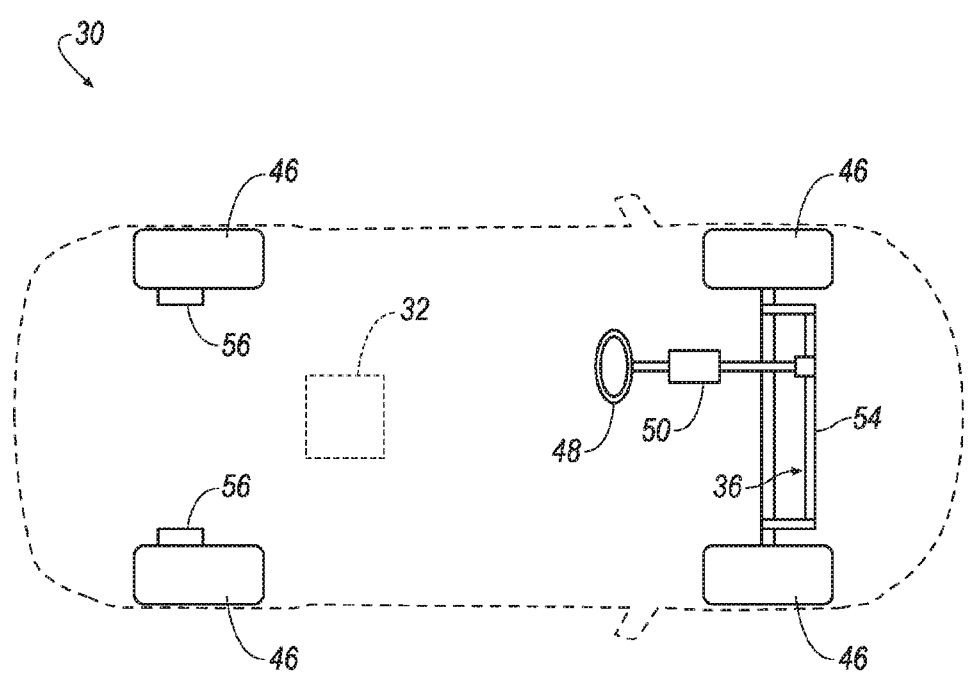
FIG. 1 is a diagram of an exemplary vehicle.

FIG. 1 shows an example vehicle 30, including a control system 32 that in turn includes a computer 34. The computer 34 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 36 and a second maximum yaw torque resulting from actuating a brake system 38. (The adjectives "first" and "second" are used throughout this document as identifiers and are not intended to signify importance or order.)

The steering system 36 may include a steering actuator 50 that is an electric power-assisted steering actuator.

The brake system 38 may include two brakes 56 coupled to respective wheels 46 on opposite sides of the vehicle 30. Additionally, the computer 34 may be programmed to command the brake system 38 to apply a net asymmetric braking force by each brake 56 applying a different braking force than the other brake 56.

The computer 34 may be further programmed to command the brake system 38 to apply a net asymmetric braking force in response to a failure of the steering system 36. Additionally, the computer 34 may be programmed to command the brake system 38 to apply a braking force to the vehicle 30 in response to the failure of the steering system 36. Additionally or alternatively, the computer 34 may be programmed to provide a warning to an occupant in response to the failure of the steering system 36.

The computer 36 may be a power-steering control module.

The control system 32 may include the steering system 36. Additionally, the control system 32 may include the brake system 38.

A method includes commanding application of one of up to a predetermined steering torque value and up to a predetermined net asymmetric braking force value, wherein each predetermined value is selected to achieve a predetermined vehicle yaw torque on the vehicle 30 that is at most the lesser of a first maximum yaw torque resulting from actuating a steering system 36 and a second maximum yaw torque resulting from actuating a brake system 38.

The steering system 36 may include a steering actuator 50 that is an electric power-assisted steering actuator.

The brake system 38 may include two brakes 56 coupled to respective wheels 46 on opposite sides of the vehicle 30. Additionally, the method may include commanding the brake system 38 to apply a net asymmetric braking force by each brake 56 applying a different braking force.

The method may include commanding the brake system 38 to apply a net asymmetric braking force in response to a failure of the steering system 36. Additionally, the method may include commanding the brake system 38 to apply a braking force to the vehicle 30 in response to the failure of the steering system 36. Alternatively or additionally, the method may include providing a warning to an occupant in response to the failure of the steering system 36.

The control system 32 allows one of the steering system 36 and the brake system 38 to take over for the other of the steering system 36 and the brake system 38 if the other fails while the vehicle 30 is executing a turn. Whichever of the steering system 36 and the braking system 38 remains operable is then able to apply sufficient yaw torque to the vehicle 30 to continue the turn. The vehicle 30 is therefore less likely to impact an object such as another vehicle or a roadway barrier, and any occupants of the vehicle 30 are less likely to be injured.

The vehicle 30 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 30 are controlled by the computer 34; in a semi-autonomous mode the computer 34 controls one or two of the propulsion, braking, and steering of the vehicle 30. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
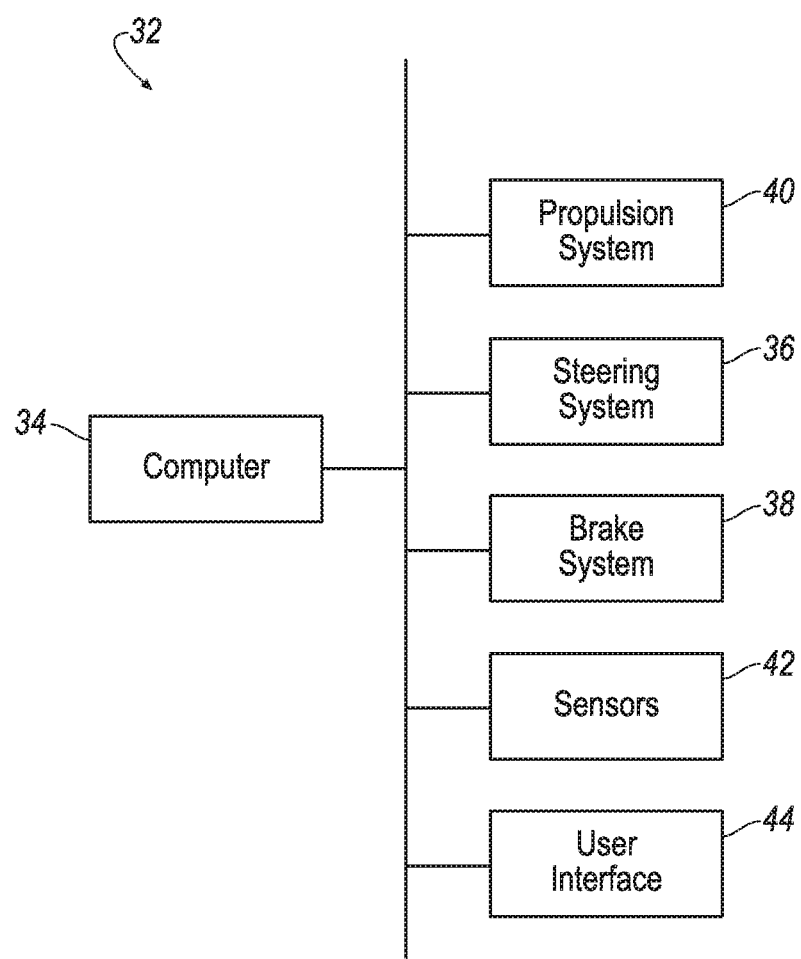
FIG. 2 is a block diagram of a control system of the vehicle of FIG. 1.

With reference to FIG. 2, the control system 32 includes the computer 34. The computer 34 is included in the vehicle 30 for carrying out various operations, including as described herein. The computer 34 is a computing device that generally includes a processor and a memory, the memory including one or more forms of computer-readable media, and storing instructions executable by the processor for performing various operations, including as disclosed herein. The memory of the computer 34 further generally stores remote data received via various communications mechanisms; e.g., the computer 34 is generally configured for communications on a communications network within the vehicle 30. The computer 34 may also have a connection to an onboard diagnostics connector (OBD-II). Although one computer 34 is shown in FIG. 2 for ease of illustration, it is to be understood that the computer 34 could include, and various operations described herein could be carried out by, one or more computing devices. The computer 34 may be a control module, for example, a power-steering control module, or may include a control module among other computing devices.

The control system 32 may transmit signals through the communications network, which may be a controller area network (CAN) bus, Ethernet, Local Interconnect Network (LIN), Bluetooth, and/or by any other wired or wireless communications network. The computer 34 may be in communication with a propulsion system 40, the steering system 36, the brake system 38, sensors 42, and/or a user interface 44, among other components.

With continued reference to FIG. 2, the propulsion system 40 of the vehicle 30 generates energy and translates the energy into motion of the vehicle 30. The propulsion system 40 may be a known vehicle propulsion subsystem, for example, a conventional powertrain including an internal-combustion engine coupled to a transmission that transfers rotational motion to road wheels 46; an electric powertrain including batteries, an electric motor, and a transmission that transfers rotational motion to the road wheels 46; a hybrid powertrain including elements of the conventional powertrain and the electric powertrain; or any other type of propulsion. The propulsion system 40 is in communication with and receives input from the computer 34 and from a human driver. The human driver may control the propulsion system 40 via, e.g., an accelerator pedal and/or a gear-shift lever (not shown).

With reference to FIGS. 1 and 2, the steering system 36 is typically a known vehicle steering subsystem and controls the turning of the road wheels 46. The steering system 36 is in communication with and receives input from a steering wheel 48 and the computer 34. The steering system 36 may be a rack-and-pinion system with electric power-assisted steering via a steering actuator 50, a steer-by-wire system, as are both known in the art, or any other suitable system. The steering system 36 may include the steering wheel 48 fixed to a steering column 52 coupled to a steering rack 54.

With reference to FIG. 1, the steering rack 54 is turnably coupled to the road wheels 46, for example, in a four-bar linkage. Translational motion of the steering rack 54 results in turning of the road wheels 46. The steering column 52 may be coupled to the steering rack 54 via a rack-and-pinion, that is, gear meshing between a pinion gear and a rack gear (not shown).

The steering column 52 transfers rotation of the steering wheel 48 to movement of the steering rack 54. The steering column 52 may be, e.g., a shaft connecting the steering wheel 48 to the steering rack 54. The steering column 52 may house a torsion sensor and a clutch (not shown).

The steering wheel 48 allows an operator to steer the vehicle 30 by transmitting rotation of the steering wheel 48 to movement of the steering rack 54. The steering wheel 48 may be, e.g., a rigid ring fixedly attached to the steering column 52 such as is known.

With continued reference to FIG. 1, the steering actuator 50 is coupled to the steering system 36, e.g., the steering column 52, so as to cause turning of the road wheels 46. For example, the steering actuator 50 may be an electric motor rotatably coupled to the steering column 52, that is, coupled so as to be able to apply a steering torque to the steering column 52. The steering actuator 50 may be in communication with the computer 34.

The steering actuator 50 may provide power assist to the steering system 36. In other words, the steering actuator 50 may provide torque in a direction in which the steering wheel 48 is being rotated by a human driver, allowing the driver to turn the steering wheel 48 with less effort. The steering actuator 50 may be an electric power-assisted steering actuator.

With reference to FIGS. 1 and 2, the brake system 38 is typically a known vehicle braking subsystem and resists the motion of the vehicle 30 to thereby slow and/or stop the vehicle 30. The brake system 38 includes brakes 56 coupled to the road wheels 46. The brakes 56 may be friction brakes such as disc brakes, drum brakes, band brakes, and so on; regenerative brakes; any other suitable type of brakes; or a combination. The brakes 56 may be coupled to, e.g., respective road wheels 46 on opposite sides of the vehicle 30. The brake system 38 is in communication with and receives input from the computer 34 and a human driver. The human driver may control the braking via, e.g., a brake pedal (not shown).

With reference to FIG. 2, the vehicle 30 may include the sensors 42. The sensors 42 may detect internal states of the vehicle 30, for example, wheel speed, wheel orientation, and engine and transmission variables. The sensors 42 may detect the position or orientation of the vehicle 30, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 42 may detect the external world, for example, radar sensors, scanning laser range finders, light detection and ranging (LIDAR) devices, and image processing sensors such as cameras. The sensors 42 may include communications devices, for example, vehicle-to-infrastructure (V2I) or vehicle-to-vehicle (V2V) devices.

The user interface 44 presents information to and receives information from an occupant of the vehicle 30. The user interface 44 may be located, e.g., on an instrument panel in a passenger cabin (not shown) of the vehicle 30, or wherever may be readily seen by the occupant. The user interface 44 may include dials, digital readouts, screens, speakers, and so on for output, i.e., providing information to the occupant, e.g., a human-machine interface (HMI) including elements such as are known. The user interface 44 may include buttons, knobs, keypads, touchscreens, microphones, and so on for receiving input, i.e., information, instructions, etc., from the occupant.

Figure 3:
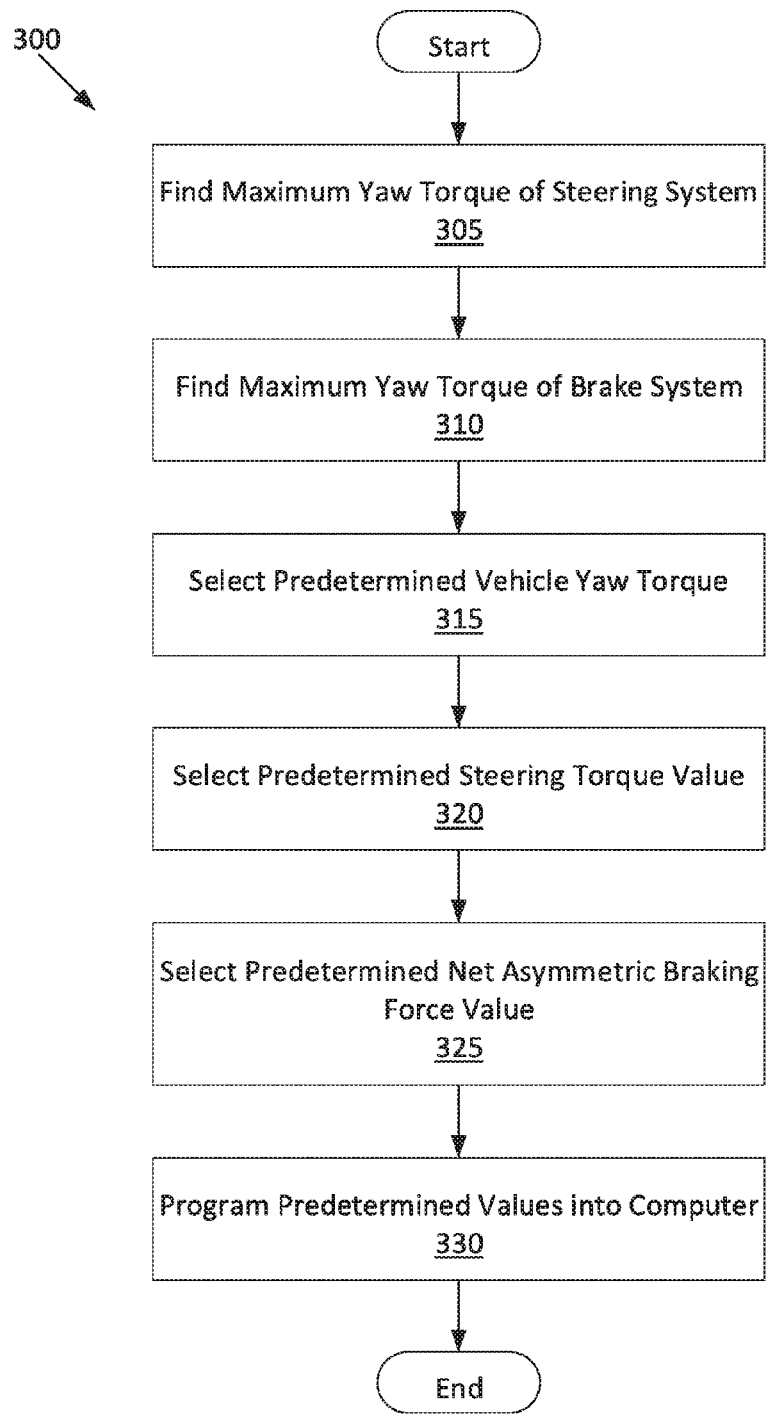
FIG. 3 is a process flow diagram of an exemplary process for selecting values preprogrammed into a computer of the vehicle of FIG. 1.

FIG. 3 is a process flow diagram illustrating an exemplary process 300 for selecting the predetermined steering torque value and the predetermined net asymmetric braking force value. The process 300 may be carried out in the course of designing the vehicle 30.

The process 300 begins in a block 305. In the block 305, a first maximum yaw torque resulting from actuating the steering system 36 is determined. A yaw torque is a torque tending to cause rotation of the vehicle 30 about an axis that is vertical relative to the vehicle 30, in other words, a torque tending to change a heading of the vehicle 30. The first maximum yaw torque is a physical limit of the steering system 36, specifically, the greatest yaw torque that can be produced on the vehicle 30 solely from actuating the steering system 36. The first maximum yaw torque may be determined by equations of dynamics of the vehicle 30, by simulations of the vehicle 30, by experiments on the vehicle 30, or by combinations of equations, simulations, and experiments.

Next, in a block 310, second maximum yaw torque resulting from actuating the brake system 38 is determined. The second maximum yaw torque is a physical limit of the brake system 38, specifically, the greatest yaw torque that can be produced on the vehicle 30 solely from actuating the brake system 38. The brake system 38 may produce a yaw torque on the vehicle 30 by actuating the brakes 56 asymmetrically, that is, actuating each brake 56 with a different braking force that the other brake 56, making the forces on the vehicle 30 from the braking system asymmetrical. Net asymmetric braking force, therefore, is defined as a difference in total braking force at the end of a moment arm to the right of the center of gravity of the vehicle 30 and the total braking force at the end of a moment arm to the left of the center of gravity of the vehicle 30, and may be measured in units of force, e.g., Newtons. The second maximum yaw torque may be determined by equations of dynamics of the vehicle 30, by simulations of the vehicle 30, by experiments on the vehicle 30, or by combinations of equations, simulations, and experiments.

Next, in a block 315, the predetermined vehicle yaw torque is selected to be at most the lesser of the first maximum yaw torque and the second maximum yaw torque. The predetermined vehicle yaw torque is selected to be equal to the lesser of the maximum yaw torques at most, or the predetermined vehicle yaw torque may be selected to be less than the lesser of the maximum yaw torques by a safety margin selected to achieve safety goals.

Next, in a block 320, the predetermined steering torque value is selected. Steering torque is defined herein as a torque applied to the steering column 52 such as the torque applied by the steering actuator 50 on the steering column 52 or other component of the steering system 36, and may be measured in units of torque, e.g., Newton-meters. The predetermined steering torque value is the steering torque producing the predetermined vehicle yaw torque in the absence of other forces or influences on the vehicle 30.

Next, in a block 325, the predetermined net asymmetric braking force value is selected. The predetermined net asymmetric braking force value is the net asymmetric braking force producing the predetermined vehicle yaw torque in the absence of other forces or influences on the vehicle 30.

Next, in a block 330, the predetermined steering torque value and the predetermined net asymmetric braking force value is stored in a memory, so as to be accessible by program instructions executable by a processor, of the computer 34. After the block 330, the process 300 ends.

Figure 4:
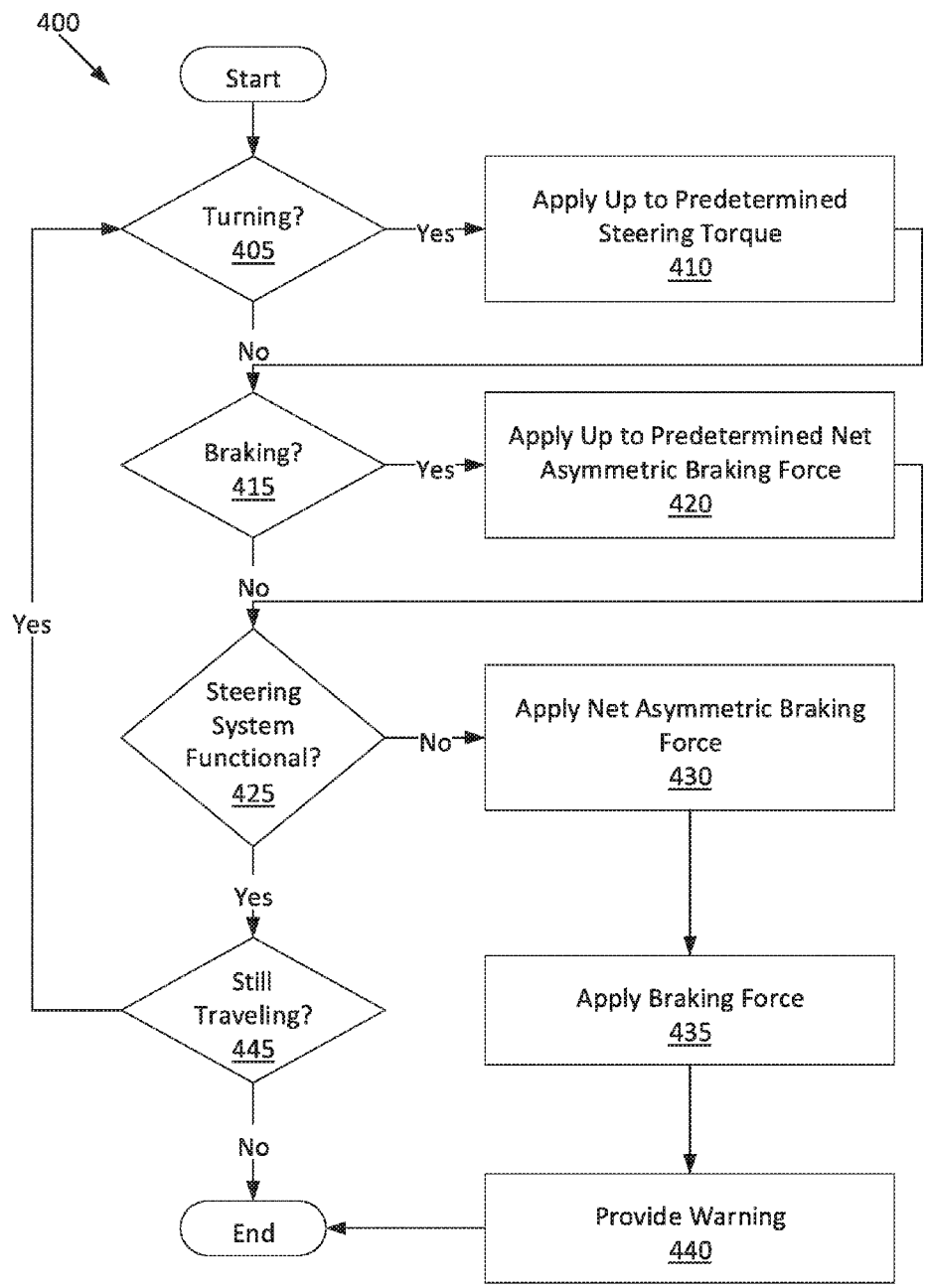
FIG. 4 is a process flow diagram of an exemplary process for controlling movement of the vehicle of FIG. 1.

FIG. 4 is a process flow diagram illustrating an exemplary process 400 for controlling movement of the vehicle 30. The computer 34 is programmed with the steps of the process 400. The process 400 may prevent the steering system 36 from operating above a limit at which the brake system 38 could take over in case the steering system 36 failed, and the process 400 describes how the brake system 38 would take over if the steering system 36 failed. The computer 34 may user the process when the vehicle 30 is operating autonomously or when the vehicle 30 is operating semi-autonomously.

The process 400 begins in a block 405. In the block 405, the computer 34 determines whether the vehicle 30 is executing a turn, that is, the steering system 36 is applying a steering torque. The turning may be chosen by an autonomous or semi-autonomous vehicle control algorithm, as is known, for navigating the vehicle 30 to a destination. Accordingly, a turn may be determined by monitoring output of such control algorithm. Additionally or alternatively, the computer 34 may obtain steering angle information from a communications network of the vehicle 30, and detect a turn where a steering angle exceeds a predetermined threshold, e.g., ten degrees. If the vehicle 30 is not turning, the process 400 continues to a decision block 415.

If the vehicle 30 is turning, following the block 405, in the block 410, the computer 34 commands application of up to the predetermined steering torque value. More specifically, the computer 34 commands the steering actuator 50 to apply a steering torque as determined by, e.g., the autonomous vehicle control algorithm, but limited to be no higher than the predetermined steering torque value. The predetermined steering torque value is a value stored in a memory of the computer 34, e.g., as described above. After the block 410, the process 400 continues to the decision block 415.

After the decision block 405, if the vehicle 30 is not turning or after the block 410 if the vehicle 30 is turning, in the decision block 415, the computer 34 determines whether the vehicle 30 is braking, that is, the brake system 38 is applying a braking force. The braking may be chosen by an autonomous or semi-autonomous vehicle control algorithm, as is known, for navigating the vehicle 30 to a destination. The braking may also be chosen by, e.g., an electronic stability control system, as is known, for counteracting skidding of one or more of the road wheels 46. If the vehicle 30 is not braking, the process 400 continues to a decision block 425.

If the vehicle 30 is braking, following the block 415, in a block 420, the computer 34 commands application of up to the predetermined net asymmetric braking force value. More specifically, the computer 34 commands the brake system 38 to apply an asymmetric braking force as determined by, e.g., the autonomous vehicle control algorithm or electronic stability control algorithm limited to be no higher than the predetermined net asymmetric braking force value. The brake system 38 may apply the asymmetric braking force by each brake 56 applying a different braking force than the other brake 56. The predetermined net asymmetric braking force value is a value stored in a memory of the computer 34, e.g., as described above.

After the decision block 415, if the vehicle 30 is not braking or after the block 420 if the vehicle 30 is braking, then, in the decision block 425, the computer 34 determines whether the steering system 36 is operational, that is, whether commands from the computer 34 for intended steering actions translate to turning by the road wheels 46. If the steering system 36 is operational, the process 400 continues to a decision block 445.

If the steering system 36 is not operational, following the block 425, in a block 430, the computer 34 commands the brake system 38 to apply a net asymmetric braking force; that is, in response to the non-operation of the steering system 36, the computer 34 commands the brake system 38 to apply the net asymmetric braking force. "In response to" in the context of this disclosure means "as a consequence of" or "caused by." The net asymmetric braking force is chosen so that the yaw torque resulting immediately from the net asymmetric braking force is approximately equal to a yaw torque resulting from the steering torque immediately before the failure of the steering system 36. Thus, the yaw torque experienced by the vehicle 30 before and after the failure, i.e., non-operation, of the steering system 36 is the same, and the vehicle 30 is able to continue on a path chosen by, e.g., the autonomous vehicle control algorithm. Applying the net asymmetric braking force will also apply a braking force to the vehicle 30, slowing the vehicle 30 and reducing the yaw torque required to continue through a turn on the path.

Next, in a block 435, the computer 34 commands the brake system 38 to apply a braking force to the vehicle 30 beyond the braking force from the net asymmetric braking force. The braking force may be chosen to bring the vehicle 30 to a stop. The vehicle 30 may follow with other maneuvers chosen by the autonomous vehicle control algorithm, such as pulling over to a side of the road.

Next, in a block 440, the computer 34 provides a warning to an occupant of the vehicle 30. The computer 34 may instruct the user interface 44 to provide the warning, for example, an auditory warning such as a beeping or a prerecorded message or a visual warning such as an indicator light or a message on a screen. After the block 440, the process 400 ends.

If the steering system 36 is operational, after the decision block 425, in the decision block 445, the computer 34 determines whether the vehicle 30 is still traveling, for example, operating along a chosen route to a destination. If the vehicle 30 is still traveling, the process 400 returns to the decision block 405 to begin the process 400 again. If the vehicle 30 is not traveling, for example, has reached its destination or has parked, the process 400 ends.

The article "a" modifying a noun should be understood as meaning one or more unless stated otherwise, or context requires otherwise. The phrase "based on" encompasses being partly or entirely based on.

Computing devices such as referenced herein generally each include instructions executable by one or more computing devices such as those identified above, and for carrying out blocks or steps of processes described above. The terms "computing device" and "computer" may be used interchangeably in this disclosure. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer programmed to:
command application of one of up to a predetermined steering torque value and up to a predetermined net asymmetric braking force value, wherein each predetermined value is selected to achieve a predetermined vehicle yaw torque on a vehicle that is at most the lesser of a first maximum yaw torque resulting from actuating a steering system and a second maximum yaw torque resulting from actuating a brake system.

2. The system of claim 1, wherein the steering system includes an electric power-assisted steering actuator.

3. The system of claim 1, wherein the brake system includes two brakes coupled to respective wheels on opposite sides of the vehicle.

4. The system of claim 3, wherein the computer is programmed to command the brake system to apply a net asymmetric braking force by each brake applying a different braking force than the other brake.

5. The system of claim 1, wherein the computer is programmed to command the brake system to apply a net asymmetric braking force in response to a failure of the steering system.

6. The system of claim 5, wherein the computer is programmed to command the brake system to apply a braking force to the vehicle in response to the failure of the steering system.

7. The system of claim 5, wherein the computer is programmed to provide a warning to an occupant in response to the failure of the steering system.

8. The system of claim 1, wherein the computer is a power-steering control module.

9. The system of claim 1, further comprising the steering system.

10. The system of claim 9, further comprising the brake system.

11. A method comprising:
commanding application of one of up to a predetermined steering torque value and up to a predetermined net asymmetric braking force value, wherein each predetermined value is selected to achieve a predetermined vehicle yaw torque on a vehicle that is at most the lesser of a first maximum yaw torque resulting from actuating a steering system and a second maximum yaw torque resulting from actuating a brake system.

12. The method of claim 11, wherein the steering system includes an electric power-assisted steering actuator.

13. The method of claim 11, wherein the brake system includes two brakes coupled to respective wheels on opposite sides of the vehicle.

14. The method of claim 13, further comprising commanding the brake system to apply a net asymmetric braking force by each brake applying a different braking force.

15. The method of claim 11, further comprising commanding the brake system to apply a net asymmetric braking force in response to a failure of the steering system.

16. The method of claim 15, further comprising commanding the brake system to apply a braking force to the vehicle in response to the failure of the steering system.

17. The method of claim 15, further comprising providing a warning to an occupant in response to the failure of the steering system.

\* \* \* \* \*